US008747225B2

(12) United States Patent
Canterbury et al.

(10) Patent No.: US 8,747,225 B2
(45) Date of Patent: Jun. 10, 2014

(54) GAMING MACHINE CHAIR

(75) Inventors: Stephen A. Canterbury, Antioch, IL (US); Jacob C. Greenberg, Elgin, IL (US); Timothy C. Loose, Chicago, IL (US); Eric M. Pryzby, Skokie, IL (US); Norman R. Wurz, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 50 days.

(21) Appl. No.: 13/348,411

(22) Filed: Jan. 11, 2012

(65) Prior Publication Data

US 2012/0115589 A1 May 10, 2012

Related U.S. Application Data

(63) Continuation of application No. 11/572,936, filed as application No. PCT/US2005/027319 on Jul. 29, 2005, now Pat. No. 8,113,517.

(60) Provisional application No. 60/592,894, filed on Jul. 30, 2004.

(51) Int. Cl.
*A63F 13/00* (2014.01)
*A63F 9/24* (2006.01)
*G07F 17/32* (2006.01)
*A47C 7/72* (2006.01)
*A63F 13/12* (2006.01)

(52) U.S. Cl.
CPC . *G07F 17/32* (2013.01); *A47C 7/72* (2013.01); *A63F 13/12* (2013.01)
USPC ........ 463/37; 463/1; 463/16; 463/20; 463/25; 463/36; 463/38; 463/39; 463/47; 297/217.1; 297/217.3; 297/411.2; 297/411.45; 297/463.2; 273/148 B

(58) Field of Classification Search
CPC .............. A63F 13/06; A63F 2001/008; A63F 2300/1025; A63F 2300/308; A47C 7/72; G07F 17/32; G07F 17/3204
USPC ............ 463/1, 36, 37, 38, 39, 47; 273/148 B; 297/217.1, 217.3, 411.2, 411.45, 463.2
See application file for complete search history.

(56) References Cited

U.S. PATENT DOCUMENTS 3,628,829 A 12/1971 Heilig
4,354,067 A 10/1982 Yamada et al.
4,710,129 A 12/1987 Newman et al.

(Continued)

FOREIGN PATENT DOCUMENTS

WO WO-2006015335 A1 2/2006

OTHER PUBLICATIONS

"U.S. Appl. No. 11/572,936 Final Office Action mailed Oct. 12, 2010", 23 pgs.

(Continued)

*Primary Examiner* — Gene Kim
*Assistant Examiner* — Alexander Niconovich
(74) *Attorney, Agent, or Firm* — Nixon Peabody LLP

(57) ABSTRACT

A gaming chair for use with a gaming machine that conducts a wagering game, the chair includes a seat and a tactile device for providing tactile sensations via the seat according to at least one of events occurring in the wagering game, and player input through an input device.

19 Claims, 12 Drawing Sheets

(56) References Cited

U.S. PATENT DOCUMENTS

| | | | | | |
|---|---|---|---|---|---|
| 4,760,527 | A * | 7/1988 | Sidley | 463/13 |
| 4,826,245 | A | 5/1989 | Entratter | |
| 4,856,771 | A | 8/1989 | Nelson et al. | |
| 5,015,933 | A | 5/1991 | Watkins | |
| 5,022,708 | A | 6/1991 | Nordella | |
| 5,129,826 | A | 7/1992 | Munsch | |
| 5,143,055 | A | 9/1992 | Eakin | |
| 5,177,912 | A | 1/1993 | Ball | |
| 5,195,746 | A | 3/1993 | Boyd et al. | |
| 5,299,810 | A | 4/1994 | Pierce et al. | |
| 5,326,104 | A | 7/1994 | Pease | |
| 5,342,047 | A | 8/1994 | Heidel et al. | |
| 5,399,091 | A | 3/1995 | Mitsumoto | |
| 5,413,357 | A * | 5/1995 | Schulze et al. | 463/5 |
| 5,429,361 | A * | 7/1995 | Raven et al. | 463/25 |
| 5,474,295 | A * | 12/1995 | Demshuk | 273/141 A |
| 5,490,784 | A | 2/1996 | Carmein | |
| 5,496,220 | A | 3/1996 | Engstrand | |
| 5,527,184 | A | 6/1996 | Trumbull | |
| 5,553,148 | A | 9/1996 | Werle | |
| 5,558,333 | A * | 9/1996 | Kelson et al. | 473/131 |
| 5,573,320 | A | 11/1996 | Shearer | |
| 5,669,818 | A | 9/1997 | Thorner et al. | |
| 5,678,886 | A | 10/1997 | Infanti | |
| 5,709,155 | A | 1/1998 | Terracciano | |
| 5,762,617 | A | 6/1998 | Infanti | |
| 5,765,910 | A * | 6/1998 | Larkin et al. | 297/172 |
| 5,807,177 | A * | 9/1998 | Takemoto et al. | 463/47 |
| 5,816,916 | A | 10/1998 | Moody | |
| 5,823,873 | A | 10/1998 | Moody | |
| 5,857,986 | A | 1/1999 | Moriyasu | |
| 5,868,687 | A | 2/1999 | Tedesco | |
| 5,901,612 | A | 5/1999 | Letovsky | |
| 5,951,397 | A | 9/1999 | Dickinson | |
| 5,954,508 | A | 9/1999 | Lo et al. | |
| 6,039,653 | A | 3/2000 | Engstrand | |
| 6,089,663 | A | 7/2000 | Hill | |
| 6,089,975 | A | 7/2000 | Dunn et al. | |
| 6,102,476 | A | 8/2000 | May et al. | |
| 6,139,324 | A | 10/2000 | Roy et al. | |
| 6,145,926 | A | 11/2000 | Lin | |
| 6,224,491 | B1 | 5/2001 | Hiromi et al. | |
| 6,270,410 | B1 * | 8/2001 | DeMar et al. | 463/20 |
| 6,283,757 | B1 | 9/2001 | Meghnot et al. | |
| 6,315,673 | B1 | 11/2001 | Kopera et al. | |
| 6,322,451 | B1 * | 11/2001 | Miura | 463/42 |
| 6,347,999 | B1 | 2/2002 | Yuan | |
| 6,369,312 | B1 | 4/2002 | Komatsu | |
| 6,371,853 | B1 | 4/2002 | Borta | |
| 6,406,334 | B2 | 6/2002 | Chu | |
| 6,412,862 | B1 | 7/2002 | Dickerson et al. | |
| 6,422,941 | B1 | 7/2002 | Thorner et al. | |
| 6,505,804 | B1 | 1/2003 | Francis et al. | |
| 6,530,842 | B1 | 3/2003 | Wells et al. | |
| 6,585,515 | B1 | 7/2003 | Roy et al. | |
| 6,638,166 | B2 * | 10/2003 | Hedrick et al. | 463/20 |
| 6,638,169 | B2 | 10/2003 | Wilder et al. | |
| 6,656,137 | B1 | 12/2003 | Tyldsley et al. | |
| 6,702,767 | B1 | 3/2004 | Douglas et al. | |
| 6,733,293 | B2 | 5/2004 | Baker et al. | |
| 6,752,716 | B1 | 6/2004 | Nishimura et al. | |
| 6,793,495 | B2 | 9/2004 | Kang | |
| 6,814,709 | B2 * | 11/2004 | Schwartz et al. | 601/57 |
| 6,910,734 | B2 * | 6/2005 | Steelman | 297/217.3 |
| 6,923,502 | B2 | 8/2005 | Cassaday | |
| 6,923,718 | B2 | 8/2005 | Brossard | |
| 6,942,574 | B1 * | 9/2005 | LeMay et al. | 463/41 |
| 7,008,022 | B2 | 3/2006 | Cassaday | |
| 7,031,384 | B2 | 4/2006 | Kondo et al. | |
| 7,125,074 | B2 * | 10/2006 | Real et al. | 297/217.3 |
| 7,188,909 | B2 | 3/2007 | Cassaday | |
| 7,217,191 | B2 * | 5/2007 | Cordell | 463/37 |
| 7,256,770 | B2 | 8/2007 | Hinckley et al. | |
| 7,273,251 | B2 * | 9/2007 | Real et al. | 297/217.3 |
| 7,322,653 | B2 | 1/2008 | Dragusin | |
| 7,328,900 | B2 | 2/2008 | Mamitsu et al. | |
| 7,358,956 | B2 | 4/2008 | Hinckley et al. | |
| 7,364,508 | B2 | 4/2008 | Loose et al. | |
| 7,367,886 | B2 * | 5/2008 | Loose et al. | 463/35 |
| 7,402,041 | B2 | 7/2008 | Nelms et al. | |
| 7,479,063 | B2 | 1/2009 | Pryzby et al. | |
| 7,602,382 | B2 | 10/2009 | Hinckley et al. | |
| 7,625,288 | B1 * | 12/2009 | Steelman | 463/46 |
| 7,691,002 | B2 | 4/2010 | Casey et al. | |
| 7,753,163 | B2 | 7/2010 | Bouchard | |
| 7,766,747 | B2 * | 8/2010 | Bonney et al. | 463/35 |
| 7,794,014 | B2 * | 9/2010 | Beall et al. | 297/217.4 |
| 7,866,747 | B2 | 1/2011 | Park | |
| 7,867,085 | B2 | 1/2011 | Pryzby et al. | |
| 8,113,517 | B2 | 2/2012 | Canterbury et al. | |
| 2001/0026087 | A1 | 10/2001 | Tomita | |
| 2003/0042772 | A1 | 3/2003 | Park | |
| 2003/0190949 | A1 * | 10/2003 | Williams | 463/24 |
| 2004/0137978 | A1 * | 7/2004 | Cole et al. | 463/16 |
| 2004/0140617 | A1 * | 7/2004 | Cordell | 273/292 |
| 2004/0166936 | A1 | 8/2004 | Rothschild et al. | |
| 2004/0251747 | A1 | 12/2004 | Bouchard | |
| 2005/0014561 | A1 | 1/2005 | Ouchi | |
| 2005/0168021 | A1 * | 8/2005 | Real et al. | 297/217.3 |
| 2005/0277469 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0012118 | A1 | 1/2006 | Mamitsu et al. | |
| 2006/0014586 | A1 * | 1/2006 | Gatto et al. | 463/46 |
| 2006/0199645 | A1 | 9/2006 | Canterbury et al. | |
| 2007/0021218 | A1 | 1/2007 | Okada | |
| 2007/0026936 | A1 * | 2/2007 | Gatto et al. | 463/25 |
| 2007/0060229 | A1 | 3/2007 | Okada et al. | |
| 2007/0123354 | A1 | 5/2007 | Okada | |
| 2007/0149291 | A1 * | 6/2007 | Mitchell | 463/46 |
| 2007/0270216 | A1 * | 11/2007 | Pryzby | 463/35 |
| 2007/0281786 | A1 | 12/2007 | Kuhn et al. | |
| 2008/0039215 | A1 | 2/2008 | Hahn | |
| 2008/0054561 | A1 | 3/2008 | Canterbury et al. | |
| 2008/0058068 | A1 * | 3/2008 | Bennett et al. | 463/20 |
| 2008/0058075 | A1 | 3/2008 | Walker et al. | |
| 2008/0064486 | A1 | 3/2008 | Pryzby et al. | |
| 2008/0176654 | A1 | 7/2008 | Loose et al. | |
| 2008/0211276 | A1 | 9/2008 | Rasmussen | |
| 2008/0214304 | A1 * | 9/2008 | Castle | 463/36 |
| 2008/0246321 | A1 | 10/2008 | Canterbury | |
| 2009/0163283 | A1 | 6/2009 | Childress | |
| 2009/0187125 | A1 * | 7/2009 | Tran et al. | 601/49 |
| 2009/0275404 | A1 * | 11/2009 | Kromydas | 463/29 |
| 2010/0048302 | A1 | 2/2010 | Lutnick et al. | |
| 2010/0151945 | A2 * | 6/2010 | Booney et al. | 463/35 |
| 2010/0234094 | A1 * | 9/2010 | Gagner et al. | 463/20 |
| 2010/0261523 | A1 | 10/2010 | Bonney et al. | |
| 2010/0291993 | A1 * | 11/2010 | Gagner et al. | 463/25 |
| 2011/0109134 | A1 * | 5/2011 | Filipour et al. | 297/217.4 |
| 2011/0143831 | A1 * | 6/2011 | Stevens et al. | 463/20 |
| 2011/0143835 | A1 * | 6/2011 | Sizelove | 463/31 |
| 2011/0201424 | A1 * | 8/2011 | Okada et al. | 463/31 |
| 2013/0137524 | A1 * | 5/2013 | Scott | 463/47 |

OTHER PUBLICATIONS

"U.S. Appl. No. 11/572,936, Final Office Action mailed Jun. 28, 2011", 32 pgs.

"U.S. Appl. No. 11/572,936, Non Final Office Action mailed Jan. 28, 2011", 27 pgs.

"U.S. Appl. No. 11/572,936, Non-Final Office Action mailed Jan. 27, 2010", 16.

"U.S. Appl. No. 11/572,936, Notice of Allowance mailed Oct. 12, 2011", 17 pgs.

"U.S. Appl. No. 11/572,936, Preliminary Amendment filed Jan. 30, 2007", 3 pgs.

"U.S. Appl. No. 11/572,936, Response filed Apr. 27, 2011 to Non Final Office Action mailed Jan. 28, 2011", 14 pgs.

"U.S. Appl. No. 11/572,936, Response filed Jul. 27, 2010 to Non Final Office Action mailed Jan. 27, 2010", 14 pgs.

"U.S. Appl. No. 11/572,936, Response filed Nov. 20, 2009 to Restriction Requirement mailed Oct. 20, 2009", 7 pgs.

"U.S. Appl. No. 11/572,936, Response filed Dec. 13, 2010 to Final Office Action mailed Oct. 12, 2010", 15 pgs.

(56) References Cited

OTHER PUBLICATIONS

"U.S. Appl. No. 11/572,936, Response filed Apr. 28, 2011 to Non Final Office Action mailed Jan. 28, 2011", 14 pgs.
"U.S. Appl. No. 11/572,936, Response filed Sep. 16, 2011 to Final Office Action mailed Jun. 28, 2011", 13 pgs.
"U.S. Appl. No. 11/572,936, Restriction Requirement mailed Oct. 20, 2009", 6 pgs.
"International Application Serial No. PCT/US05/27319, International Preliminary Report on Patentability mailed Feb. 8, 2007", 5 pgs.
"International Application Serial No. PCT/US05/27319, International Search Report mailed Jan. 4, 2006", 2 pgs.
"International Application Serial No. PCT/US05/27319, Written Opinion mailed Jan. 4, 2006", 6 pgs.

* cited by examiner

GAMING MACHINE CHAIR

CROSS-REFERENCE TO RELATED APPLICATION

This application is a continuation of U.S. patent application Ser. No. 11/572,936, filed on Sep. 21, 2007, now issued as U.S. Pat. No. 8,113,517, which is a U.S. National Stage Filing under 35 U.S.C. 371 from International Patent Application Serial No. PCT/US2005/027319, filed on Jul. 29, 2005, and published on Feb. 9, 2006 as WO 2006/015335 A1, which claims the benefit under 35 U.S.C. 119 (e) of U.S. Provisional Application No. 60/592,894 filed on Jul. 30, 2004, which are hereby incorporated by reference in their entireties.

FIELD

The present invention relates generally to gaming machines and, more specifically, to a gaming chair with player comfort and convenience features.

COPYRIGHT

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, WMS Gaming, Inc. All Rights Reserved.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

Gaming machine design and innovation has primarily focused on game play, attraction devices, lighting, bonus rounds, payout mechanisms, progressives, and networking. The gaming chair has received less attention and as a primary source of player comfort and convenience, is an optimal location for devices and features typically located elsewhere in a gaming environment. Additionally, innovations such as the automation of certain chair features would also provide comfort and convenience to a gaming venue patron.

While player comfort has been addressed to some extent, typically, this has only been isolated to ergonomics and some adjustability features. Less attention has been paid to automating positioning, cushioning, and other tactile features. Materials used in other industries to promote comfort for individuals maintaining a prone, sitting position for extended periods of time can be used to alleviate discomfort and create an environment that enhances the gaming experience. Additionally, players typically cannot sit back in the gaming chair and relax in comfort because the game play buttons are located on the gaming machine requiring most users to lean forward. A remote, game play device would allow the player to sit back in the chair or even recline while playing the game.

Convenience features, typically not found on a gaming chair or located elsewhere in a gaming venue, also enhance the enjoyment realized by gaming patrons. In many instances, crowded gaming establishments provide convenience devices throughout the game floor requiring the patron to leave the gaming machine they were playing and thus, lose their spot and have to wait until another gaming machine they wish to play becomes available. Should these convenience features be co-located on the game chair, a player could maintain occupancy of the game machine and continue to play without interruption (increasing enjoyment for the player and revenue for the gaming venue).

Entertaining features such as motion simulation synchronized to the game could also add value to a “typical” gaming environment.

SUMMARY

The present disclosure relates to a gaming chair that provides stimulation, convenience, and comfort features player or game initiated simulated motion, adjustability, tactile sensations, temperature control, and a variety of other features suited to providing a player the means to create a gaming environment of choice and increase enjoyment of the game. According to one embodiment, the gaming chair includes a motion device for simulating motion as directed by events occurring on the gaming machine. According to one embodiment, the gaming chair includes an audio speaker for creating game or player initiated tactile sensations.

BRIEF DESCRIPTION OF THE DRAWINGS

The foregoing and other advantages of one or more embodiments of the present invention will become apparent upon reading the following detailed description and upon reference to the drawings in which.

Figure 1:
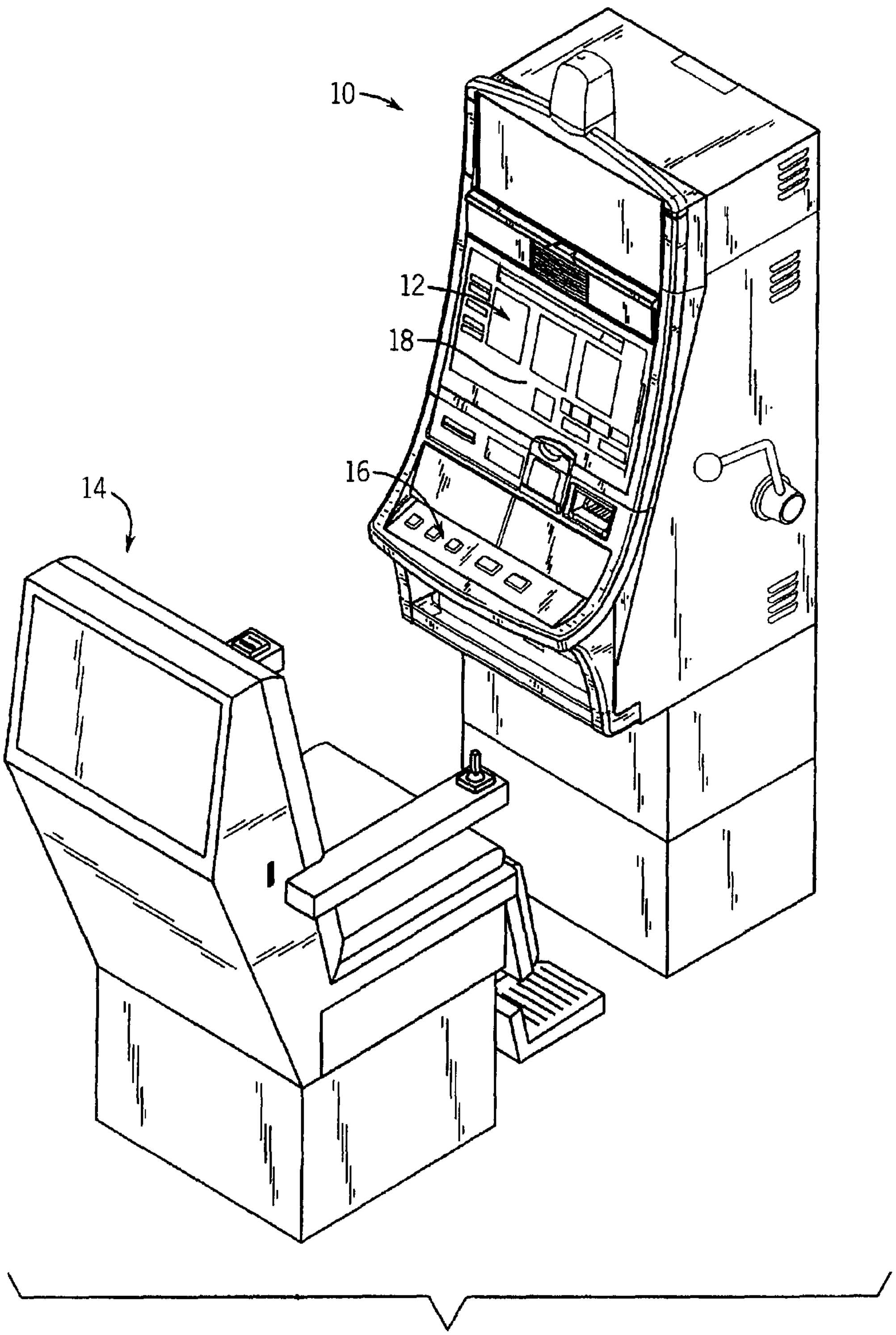
FIG. 1 is a perspective view of a gaming machine with a gaming chair in accordance with one embodiment.

While various embodiments of the present invention are susceptible to various modifications and alternative forms, specific embodiments have been shown by way of example in the drawings and will be described in detail herein. However, it should be understood that the invention is not, intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a slot-based wagering game and a gaming chair 14 operable to receive instructions from the gaming machine 10 or a player. The gaming chair 14 is located in operational proximity of the gaming machine 10. In operation, the gaming machine 10 receives a wager from the player to purchase a "play" of the game. In a "play" of the game, the gaming machine 10 generates at least one random event and provides an award to the player for a winning outcome of the random event. The random event may be internally or remotely determined using a random number generator or pooling schema. To portray the random event and outcome to the player, the gaming machine 10 includes a primary display 12. If the wagering game is a reel slot game, for example, the primary display 12 includes a plurality of symbol bearing reels that are rotated and stopped to place symbols on the reels in visual association with the pay line.

The primary display 12 may be implemented with a CRT, LCD, plasma, mechanical reels (in the case of a reel slot game), or other type of display known in the art. The primary display 12, especially if implemented in video, may be overlaid with a touch screen to facilitate interaction with the player. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

Figure 2:
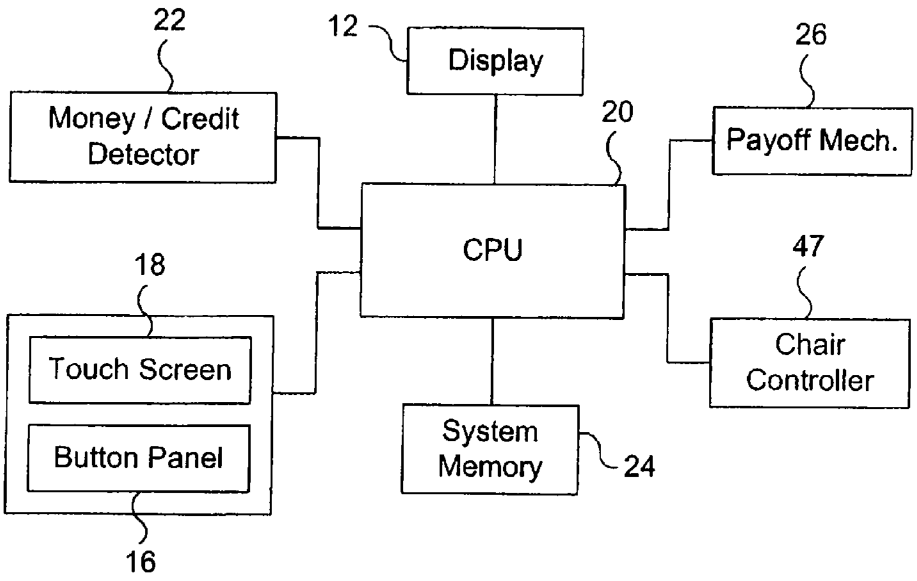
FIG. 2 is a block diagram of a control system suitable for operating the gaming machine and game chair.

FIG. 2 is a block diagram of a control system suitable for operating the gaming machine. Money/credit detector 22 signals a central processing unit (CPU) 20 when a player has inserted money or played a number of credits. Using a button panel 16 on the gaming machine 10 (see FIG. 1), a touch screen 18 on the gaming machine 10 (see FIG. 1), a button panel 39 on the gaming chair 14 (see FIG. 3), or a touch screen panel 76 on the gaming chair 14 (see FIG. 7), the player may select any variables associated with the wagering game and place his/her wager to purchase a play of the game. In a play of the game, the CPU 20 generates at least one random event using a random number generator (RNG) and provides an award to the player for a winning outcome of the random event. Alternatively, the random event may be generated by a remote computer using an RNG or pooling schema and then transmitted to the gaming machine. The CPU 20 operates the display 12 to represent the random event(s) and outcome(s) in a visual form that can be understood by the player. In addition to the CPU 20, the control system may include one or more additional slave control units for operating the display 12 and any secondary 5 displays.

Continuing with FIG. 2, system memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24. Chair controller 47 is operable to respond to signals from the CPU 20 as directed by the gaming software or input from the player into the gaming machine 10 and controls automated functions provided on the gaming chair 14.

Figure 3:
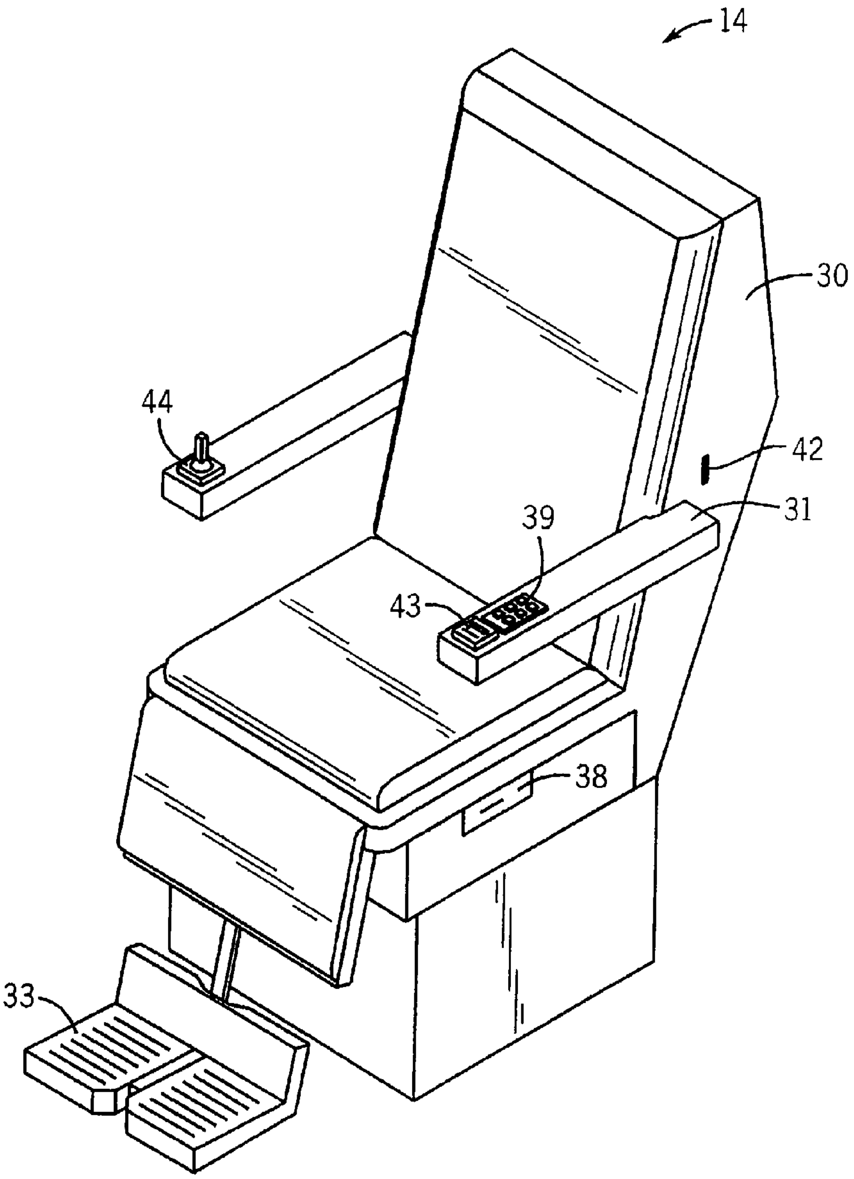
FIG. 3 is a perspective view of a gaming chair that provides simulated motion in response to the game.

In accordance with one embodiment, FIG. 3 shows an example of a gaming chair 14 operable to receive and process signals from the gaming machine 10 (see FIG. 1) and provide simulated motion based on events occurring during game play. Communication between the gaming chair 14 and the gaming machine 10 may be accomplished a number of ways including wireless transceivers, direct connectivity via a wire harnesses run above or under the floor or through overhead piping. Gaming chair 14 also is operable to receive instructions from the player though a button panel 39 located on the chair's armrest 31. Other features include, but are not limited to a footrest 33, a ticket printer 38, a card read/write device 43, a joystick 44, and a retractable tape 42 for restricting use of the gaming chair 14 or gaming machine 10. It is understood that the various components of the gaming chair 14, although depicted in FIG. 3 in one embodiment, may be positioned in various locations on the gaming chair 14 and mayor may not be duplicated on the gaming machine 10.

Figure 4C:
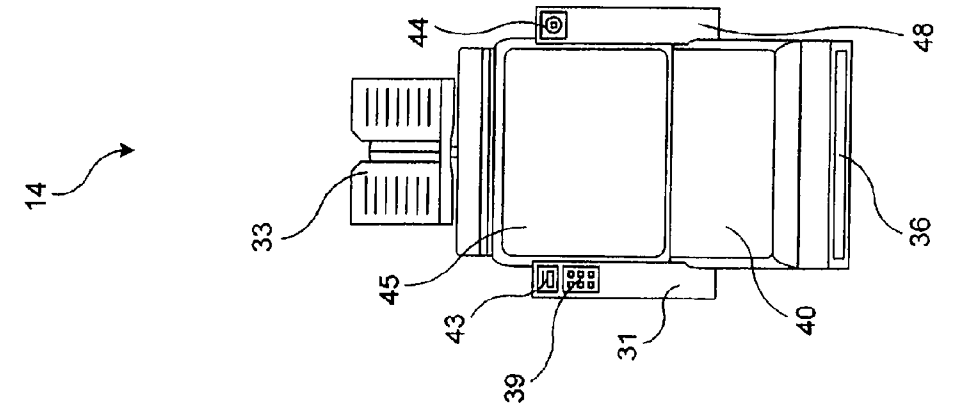
FIGS. 4*a* though 4*c* are side, rear, and top views of the gaming chair of FIG. 3.

FIGS. **4*a* through 4*c* present various views of the gaming chair 14 of FIG. 3. FIG. 4*a* is a side view of gaming chair 14. A base cover 32 conceals a support post 34 that is the main support structure for the gaming chair 14. The support post 34, while supporting the weight of the gaming chair 14 and the player seated in gaming chair 14, also is moveable to a small degree to allow for a range of motion. The base cover 32 can be any material that allows the base of the gaming chair 14 to move within the limits of its intended range of motion while concealing the internal components. Example materials include but are not limited to fabric, rubber, and leather. Three "motion arms" 37 are connected to actuators 46 concealed beneath the seat of the gaming chair 14. The actuators 46 can be hydraulic, electromechanical, or pneumatic. The opposite ends of the motion arms 37 are connected to a floor plate or positioned securely on the floor beneath the gaming chair 14. The actuators 46 respond to signals received by a controller 47 from the gaming machine or from a button panel 39 on the gaming chair's armrest 31. The actuators 46 expand and contract the motion arms 37 in a sequence or manner supporting the desired simulated motion presented during game play or requested by the player (for example, a "rocking" motion). The motion arms 37** are configured to provide three types of movement: heave (move up and down), pitch (tilt forward and back), and roll (tilt side to side). Those familiar with the industry will recognize these movements as degrees of freedom (DOF). While one embodiment offers 3-DOF, additional actuators could be added to provide other movements equating to 4-DOF or 6-DOF. These other movements include surge (move forward and back), sway (move side to side), and yaw (twist). Other embodiments provide other tactile motions such as vibrations, shaking, pulsations, etc., that can be delivered via a controller of the gaming machine or user actuated.

Other methods of providing simulated motion may also be used such as a cam mechanism that forces a plate positioned under a seat to pitch and roll as disclosed in U.S. Pat. No. 6,315,673 Kopera, et al, which is incorporated herein by reference in its entirety. While defined in this embodiment as the main support member, the support post 34 is optional and potentially unnecessary provided the motion arms 37 are capable of providing the required support or other means of supporting the gaming chair 14 are instituted. The controller 47 is a printed circuit board with various components including a microprocessor. The controller 47 is enclosed in a grounded material suitable to shield the controller 47 from external interference such as electrostatic, radio frequency, and magnetic energy. The enclosure could be a box or other shape suitable to enclose the controller 47 and can be constructed of, but not limited to, the following materials: aluminum, copper, and zinc plated steel. Any connections to the controller 47 are preferably accomplished using shielded cable. Connectors are also housed in a metal grounded enclosure.

Additionally, gaming chair 14 is configured with heating/cooling devices 35 located in a main chair body 30 directly behind a back cushion 40 and directly below a seat cushion 45. Another heating/cooing device 35 is located within a footrest 33. All heating/cooling devices on gaming chair 14 respond to signals received by the controller 47 from the gaming machine or from the button panel 39 on the gaming chair's left armrest 31. The method by which the heating/cooling devices provide temperature alteration may be one or a combination of radiant methods selected from a group consisting of forced air, electric, and piped liquid. The temperature change of devices 35 can deliver a tactile sensation to a player which can be delivered by the gaming machine in response to actions within the game or can be user actuated.

Another feature presented on the gaming chair 14 is a ticket printer device 38. The ticket printer device 38 responds to signals received from the gaming machine's main processor 20 after the player has signaled a desire to cash out. The ticket printer device 38 prints tickets equating to currency values according to currency or credits used in the gaming machine's locale. The value of the printed ticket is equal to the cash or credit value displayed by the gaming machine 14 prior to printing the ticket. Tickets printed by the ticket printer device 38 typically are presented to a cashier (in the establishment where the gaming machine 14 resides) for conversion into cash. Preferably, tickets issued by the ticket printer device 38 may also be inserted into a bill-validating device located on the gaming machine 14 or on the gaming chair 14. The cash or credit value of the ticket is then transferred to the gaming machine's credit meter. Alternatively, the ticket printer device 38 could print other certificates or vouchers for prizes, coupons, meals, selected items at local or national restaurants and stores, or entry forms for raffles or lotteries. Credit for items such as airline miles and phone card minutes can also be printed should the game offer such prizes. While this embodiment shows the ticket printer device 38 installed below the seat cushion 45 on the left side of the gaming chair 14, the location can be anywhere on the gaming chair 14 and is bound only by the convenience of accessing the device, design considerations, and available space.

Continuing with FIG. 4*a*, the gaming chair 14 also has a number of features located on the left armrest 31. A scent emitter 41 located on the inner portion of the left armrest 31 provides a variety of scents that can be delivered in response to the player's input through button panel 39 or as a direct result of game play. The components comprising the scent feature are housed in the main chair body 30 with tubing configured to deliver the generated scents from the components to the scent emitter 41. The components comprising the scent feature can also be housed directly in the armrest 31. While this embodiment shows the scent emitter 41 located on the left armrest 31 of the gaming chair 14, the location can be anywhere on the gaming chair 14 and is bound only by the practicality of delivering the scent to an area that allows the aroma to be realized by the player. Design considerations and available space are also factors in determining the proper location for the scent emitter 41 and its associated components.

Noted earlier, the button panel 39, positioned on the left armrest 31, provides input to a number of features including, but not limited to, the chair's simulated motion, heating/cooling devices 35, scent emitter 41, game play, and various gaming machine controls. The button panel 39 is comprised of, but not limited to, any of the following types of buttons including capacitive, resistive, and acoustic touch screen, magnetic switch, electromechanical switch, membrane switch, and elastomeric, a technology used on such devices as television remote controls. The buttons preferably have locator bumps or raised surface areas on them for easy touch recognition that is especially useful in allowing the player to continually view the gaming machine display without the need to look down at the button panel 39 on the left armrest 31. The buttons can be illuminated from an internal source such as a light emitting diode (LED).

Another aspect of gaming machine 14 shown in FIG. 4*a* and positioned in this embodiment on left armrest 31 is a card reader 43 used to read and write player tracking information on a magnetic strip located on a player's personal tracking card. The information exchanged between the card and the card reader 43 can be game related information or chair related information. For example, if the card reader 43 is located on a gaming chair 14 with automated positioning features (described in another embodiment), the player can instruct the gaming machine 10 or the gaming chair 14 to save the position of the gaming chair 14 on the player tracking card so the next time the player uses any like machines, the gaming chair 14 will automatically adjust itself to the position set by the player. Card reader 43 may be a magnetic reader requiring the player to insert an object, such as a credit card or similar card with a magnetic strip containing player accounts or other information, into the card reader 43 wherein the player information or credit card account number is read from the magnetic strip. The card reader 43 may also be a device capable of reading a token waved in front of it using a short-range wireless link. Other methods of communicating information to and receiving information from a gaming machine may also be used and are fully disclosed in U.S. Patent Publication No. 2003/0045354 to Giobbi, filed on Sep. 10, 2001 and entitled "Portable Data Unit for Communicating with Gaming Machine over Wireless Link," which is incorporated herein by reference in its entirety.

Referring to the back of the gaming chair 14, a glass artwork display 36 is positioned near the top of the chair back. The glass artwork 36 may, for example, include billboard information, product or service advertisements, player attraction material, pay tables (e.g., within a single game or for different games available via a multi-game machine), bonusing information, game help information, game play instructions, variable themes associated with a particular casino or gaming machine, and combinations thereof. The glass artwork 36 may be illuminated by a variety of methods including incandescent, fluorescent, LED, cold cathode fluorescent lamp (CCFL), and other means such as embedding LEDs in a light dispersing material as described in U.S. Patent Application No. 60/572,615 to Kopera, et al, filed on May 19, 2004 and entitled "Gaming Machine with Light Altering Features," which is incorporated herein by reference in its entirety. These methods can be deployed as back, direct, or indirect lighting. The position of the glass artwork 36, respective of the "viewable" areas on the gaming chair 14, is not limited to the back but may be placed on the sides or extending above the chair by means of a post connected to the chair top or other suitable methods. Alternatively, the artwork 36 could be constructed of a vacuum molded, semi-transparent substance such as plastic, Plexiglas, or other material suitable to create a raised surface that provides perspective to the viewer while allowing backlighting as the illumination method. Another aspect of one embodiment of the gaming chair 14 is a retractable cordon 42 used, to restrict access to the gaming chair 14 and the gaming machine 10. The retractable cordon 42 is wound onto a spring-loaded reel, mounted internally on the side of the gaming chair 14, that automatically winds the cordon back onto the reel after use. The end of the retractable cordon 42 can be configured with a proprietary or standard clip mechanism that may be placed in a receptacle on another gaming chair located adjacent to the gaming chair 14, on the associated gaming machine 10 or adjacent gaming machine. The use of the retractable cordon 42 allows a casino to restricts use of the gaming chair 14 or associated gaming machine if the either is out of service, the gaming machine is reserved for tournament play, or other appropriate reasons. Manufactures of such devices include Lawrence Metal Products, Bay Shore, N.Y., makers of TensaBarrier Retractable Tape System.

Figure 4B:
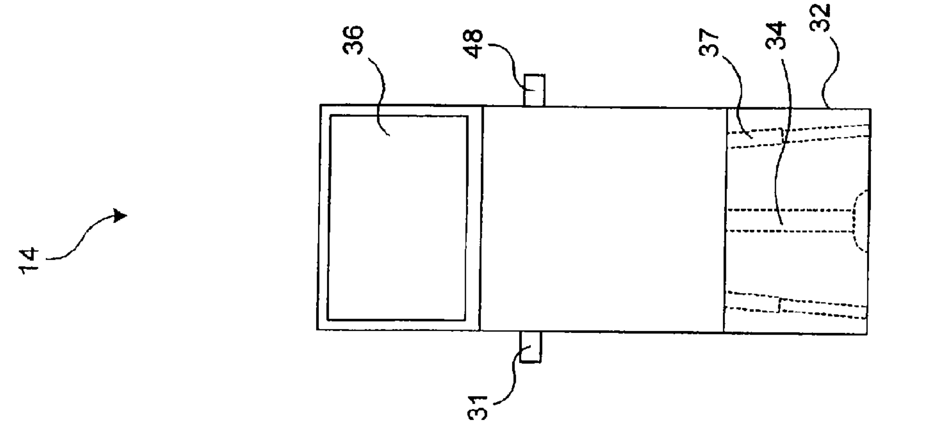
Figure 4A:
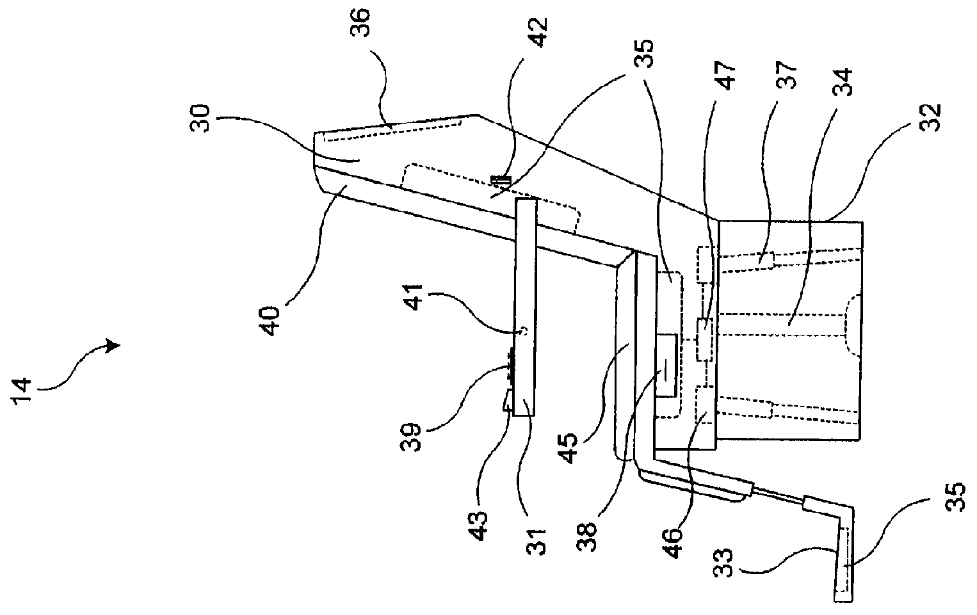

FIG. 4*b* is a rear view of gaming chair 14 showing left armrest 31, base cover 32, support post 34, glass artwork display 36, motion arms 37, and right armrest 48.

FIG. 4*c* is a top view of gaming chair 14 showing left armrest 31, footrest 33, glass artwork display 36, button panel 39, back cushion 40, seat cushion 45, and a joystick 44, mounted on right armrest 48. Joystick 44 can be used for a variety of purposes including game setup, game play, help-screen selections, on-screen chair controls, and other control functions. A variation of the joystick could be a paddle controller depending on the needs of the game or the method used to select on-screen features from a menu. For one embodiment, a paddle controller is a rotating knob similar to a light-dimming switch. Other input devices that could be used for the same purposes are a trackball or a fixed PC mouse.

While the embodiment shown in FIG. 4*a* through 4*c* presents the features in certain positions, it will be appreciated by those with ordinary skill in the art that the location of any feature is dependent on such factors as the requirements of the feature, the design of the gaming chair, ergonomics, player convenience, and the economy of the design.

Figure 5:
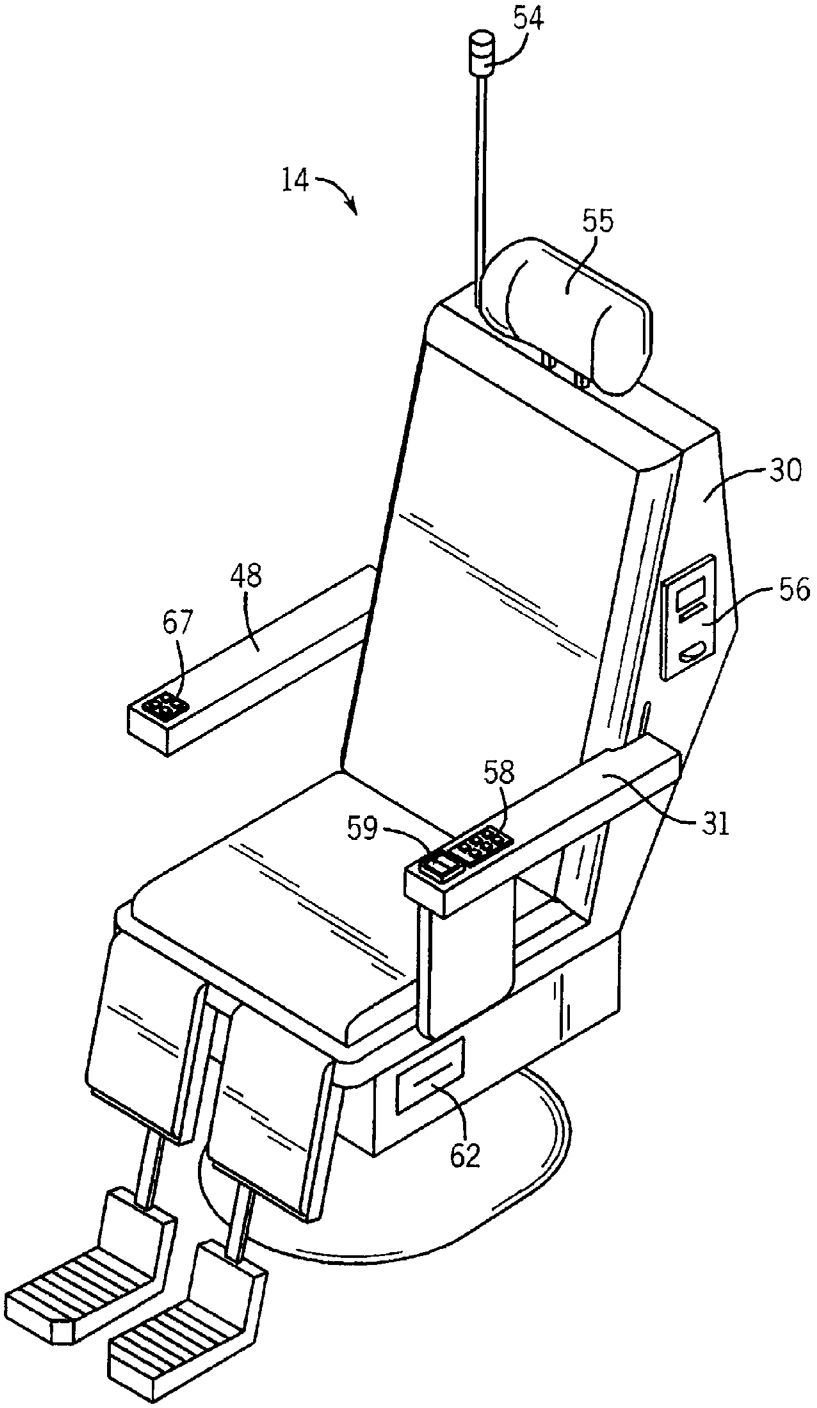
FIG. 5 is a perspective view of a gaming chair that provides adjustable positioning for player comfort.

In another embodiment, a gaming chair 14 with multiple features and controls to support user initiated positioning is presented in FIG. 5. As an alternative to a gaming machine tower light or "candle", the gaming chair 14 is configured with a tower light 54. An adjustable headrest 55 is provided for additional player comfort. Other features include adjustable armrests 31, 48, a button panel 58 for controlling the chair's position, an ashtray 59, a tissue/hand wipe/napkin dispenser 62, a button panel 67 for game control, and a bill changer 56 located in the chair back 30.

Figure 6A:
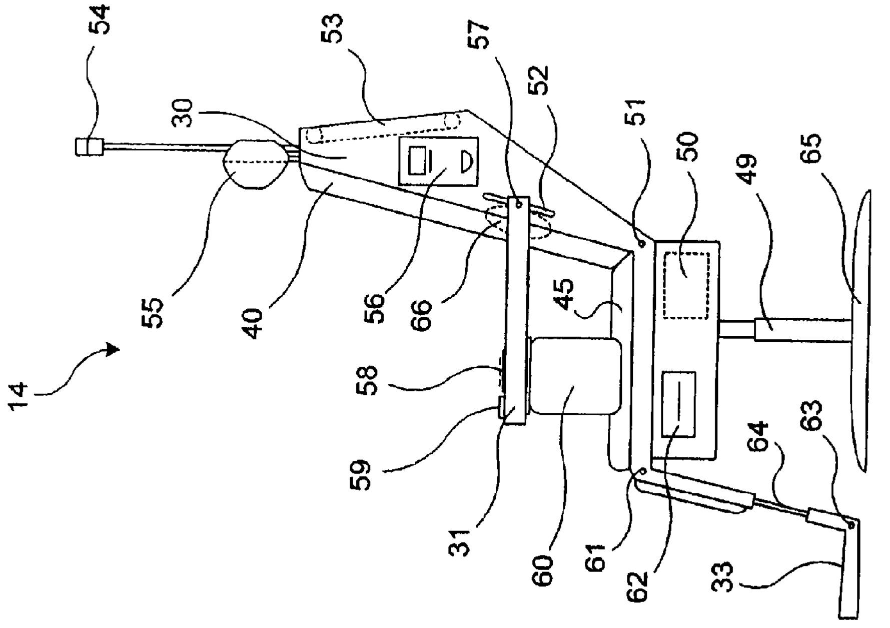
FIGS. 6*a* through 6*c* are side, rear, and top views of the gaming chair of FIG. 5.

FIG. 6*a* is a side view of the gaming chair 14 shown in FIG. 5. Tower light 54 is connected to chair back 30 and informs players of the games currency value, informs casino employees of technical issues, or is used as a mechanism for a player to call an attendant. Headrest 55 is height adjustable and could be configured with side supports that fold in towards the side of the player's head to help maintain the head's position keeping it from moving to either side and thus relieving neck strain. This feature is commonly found in passenger airplane headrests.

The "adjustability" of the gaming chair 14 is further found in a number of features namely seatback pivot 51, leg rest pivot 61, footrest pivot 63, armrest pivot 57, armrest height adjust slots 52, adjustable footrest support 64, chair height adjust and swivel via post 49, and chair position adjusted on base 65. A chair feature button panel 58 located on right armrest 31 can control each of these chair adjustment features. Seatback pivot 51 allows the chair back 30 and attached back cushion 40 to pivot back add forth creating the ability of adjusting this portion of gaming chair 14 to the position preferred by the player. Leg rest pivot 61 allows the player to adjust his/her leg position by pivoting the footrest 33 and footrest support 64 upward or downward. The adjustment can be performed for both legs simultaneously or individually as two footrests 33 and footrest supports 64 are included. Footrest support 64 also adjusts up and down to position the footrest 33 at the correct height for the player seated in the gaming chair 14. Footrest pivot 63 enables the player to adjust the position of the base of footrest 33 relative to the player's feet. Depending on the position of the leg rest pivot 61, the player may want to position the footrest 33 in such a way as to alleviate any pressure on the player's ankles.

Continuing with FIG. 6*a*, the position of the gaming chair 14 relative to the gaming machine 10 can be adjusted three ways. Post 49 is positioned within a track in base 65 allowing the gaming chair 14 to move towards and away from the gaming machine 10. Post 49 also contains pneumatics, hydraulics, or electromechanical mechanism allowing the chair to be raised or lowered according to instructions entered by the player using chair feature button panel 58. Post 49 also allows the gaming chair 14 to swivel. Left armrest 31 and right armrest 48 (see FIG. 6*c*) are height-adjustable using a slot 52 to move the armrest pivot 57, connecting the armrest to the chair back 30, up or down. This allows the player to position the armrests in such a manner as to provide a comfortable arm position during game play using a game play button panel 67 (see FIG. 6*c*) or chair feature button panel 58. Armrest pivot 58 pivots the left armrest 31 up to a position just past 90 degrees vertical along the same angle as the back cushion 40. This moves the armrest 31 out of the way and allows a player easier access to the actual seating position. Once seated, the player can pivot the left armrest 31 back to its horizontal position as depicted in FIG. 6*a*. This mechanism can also be applied to right armrest 48 (see FIG. 6*c*). Another comfort feature provided by gaming chair 14 is a lumbar support device 66 located within chair back 30 and back cushion 40. A number of methods can provide lumbar support including an adjustable bar ruing horizontally through the back cushion 40 or a powered air bag device that inflates and deflates according to player input through chair feature button panel 58 located on left armrest 31.

An additional feature located on gaming chair 14 is a foldout tray 60 table similar to foldout trays found on passenger airplanes. The foldout tray is available for the convenience of the player who, in many instances, may want to place personal items in a location easily viewed while continuing to play the game. Another convenience feature is an ashtray 59 located on the left armrest 31. The ashtray 59 contains a cover and includes a "smokeless" feature using an internal fan to draw idle smoke from the cigar or cigarette into a filter or though a duct system to be released outside the gambling facility. Other types of ashtrays could be used such as a simple open-topped removable ashtray. A convenience feature located on a side of the gaming chair 14 and below the seat cushion 45 is a tissue/hand wipe/napkin dispenser 62 providing the player with the means to maintain a certain level of cleanliness if so desired. The handy wipes could be antibacterial for those players wishing to clean gaming chair 14 or gaming machine 10 surfaces and/or buttons before use. The tissue/hand wipe/napkin dispenser 62 may include only one of the offerings or a combination.

Continuing with FIG. 6*a*, an internal jukebox 50 located below the seat cushion 45 provides a variety of music types and artists to the player. The player may select individual songs or entire albums through the button panel 58 on armrest 31. The gaming machine display 12 (see FIG. 1) presents all the available choices found in the jukebox 50 and provides the player with feedback during the selection process. The jukebox 50 can be anyone of a variety of audio delivery devices but is more likely to be selected from a group of digital devices including flash memory, hard disk drive, compact disk drive, and optical disk. The format of the audio data stored on these devices may be compressed and include MP3, Ogg Vorbis (an open audio encoding and streaming technology), and Dolby Advanced Audio Coding (AAC). Uncompressed PCM audio may also be used such as Wave and Audio Interchange File Format (AIFF). Alternatively, the jukebox 50 could be operated on a local or remote server while still controlled by the player through the same button panel 58. Controlling the jukebox 50 is accomplished via an on-screen menu allowing players to select music types, artists, and songs, setting up a play list to be played on command from the player. Play lists can be stored on player tracking cards and instantly added to another gaming chair's jukebox 50.

FIG. 6*a* also shows a scrolling display mechanism 53 located on the chair back 30 facing the rear of the gaming chair 14. The mechanism 53 includes a flexible sheet/display member containing multiple images. This display member is affixed to supply/take-up rollers that are driven by gearing attached to a single or multiple stepper motors. These motors are connected to a controller that, in turn, communicates with the main CPU 20 for instructions. An optical sensor is used to maintain correct positioning of the scrolling display member. The display member can be illuminated in any number of ways including back lighting. Other alterable display mechanisms 53 could be used such as a rotating or sliding shutter display. Also included in chair back 30 and presented to the player on the side of the gaming chair 14 is a bill changer or change machine 56. The change machine 53 could be used to simply exchange a paper bill for coins. It may also be used to cash in tickets printed from a ticket printer as a result of a cash out, provide the actual cash out currency or ticket, and provide a method of tipping an attendant during game play without have to do so manually. The tipping method is tied directly to the number of credits currently displayed on the gaming machine's display. A player can setup a tip amount directly or have that tip amount stored on his/her playing tracking card and, when entered, provide the CPU with the tip amount. When a "gratuity" button is pressed, the predetermined tip amount is delivered to the change machine.

Figure 6B:
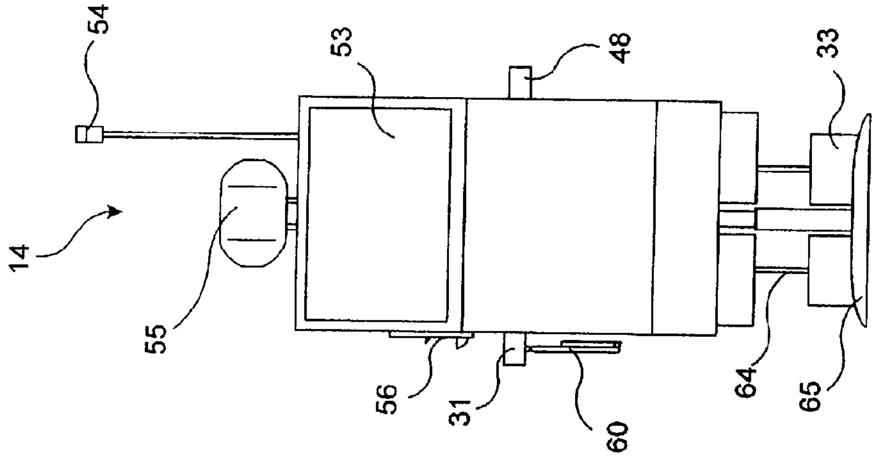

FIG. 6*b* is a rear view of gaming chair 14 showing left armrest 31, footrest 33, right armrest 48, scrolling display 53, tower light 54, head rest 55, change machine 56, foldout tray 60 table, footrest support 64, and base 65.

Figure 6C:
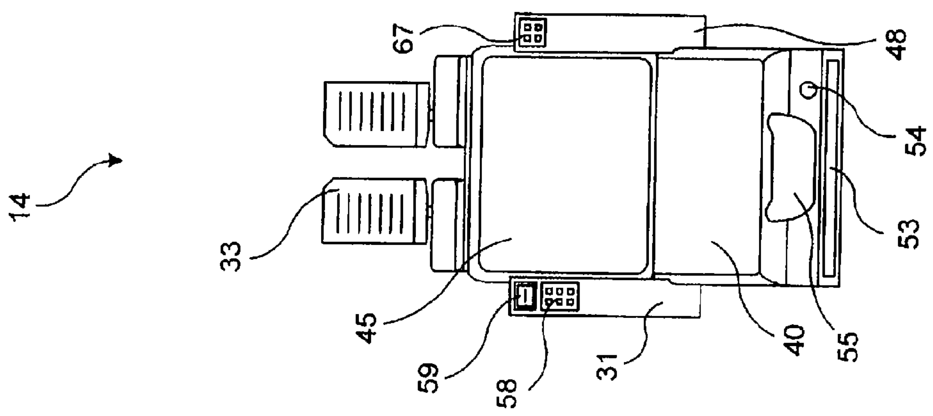

FIG. 6*c* is a top view of gaming chair 14 showing left armrest 31, footrest 33, seat back 40, seat cushion 45, right armrest 48, scrolling display 53, tower light 54, head rest 55, button panel 58 for controlling chair features, ash tray 59, and another button panel 67 for controlling the gaming machine 10 during game play. While the embodiment shown in FIG. 6*a* through 6*c* presents the features in certain positions, it will be appreciated by those with ordinary skill in the art that the location of any feature is dependent on such factors as the requirements of the feature, the design of the gaming chair, ergonomics; player convenience, and the economy of the design.

Figure 7:
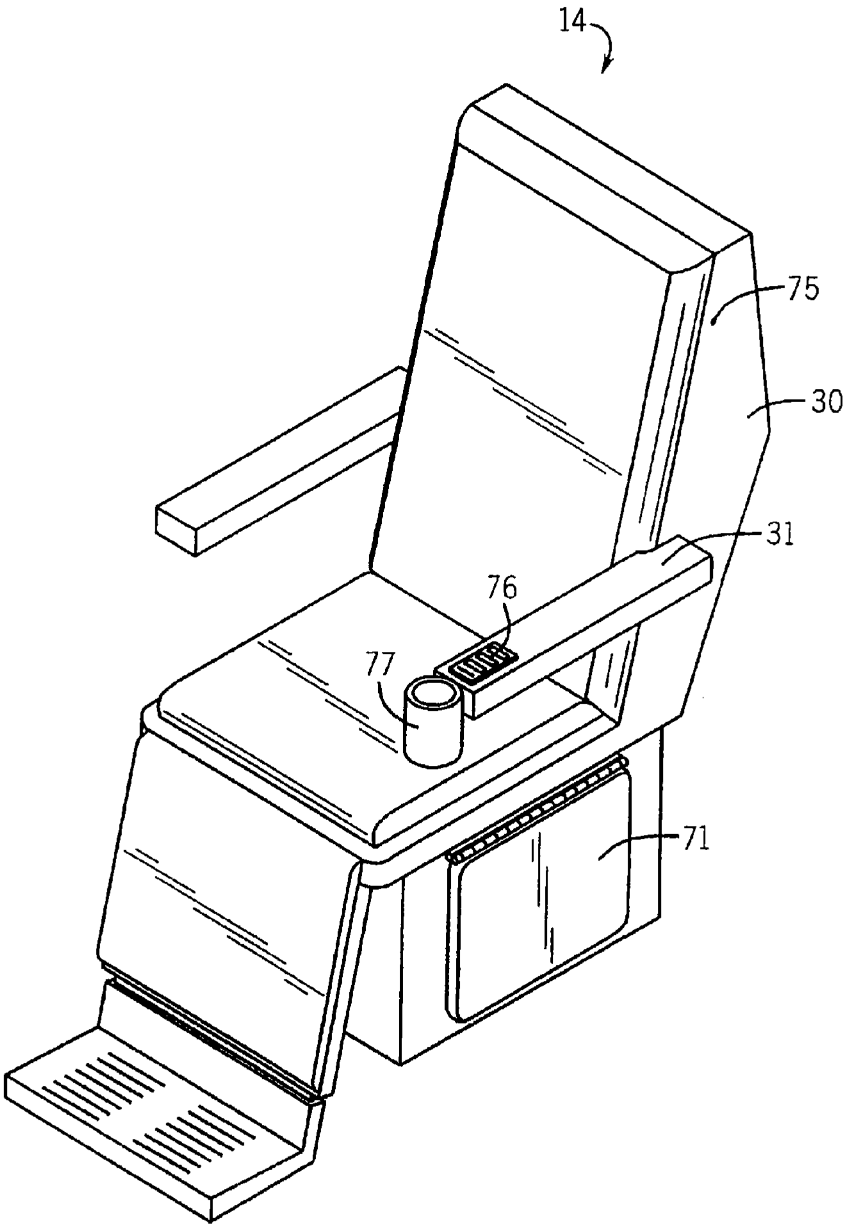
FIG. 7 is a perspective view of a gaming chair that provides tactile features in response to player input or the game.

In yet another embodiment, a gaming chair 14 with multiple features and controls to support user or game initiated tactile sensations is presented in FIG. 7. A touch screen panel 76 on left armrest 31 controls a number of features including audio speaker initiated vibration and audio controls for game or player initiated audio streams. Installed on chair back 30 is a headphone jack for personal audio reception over player or establishment-provided headphones. Additionally, a foldout companion seat 71 is available as a convenience feature for onlookers.

Figure 8C:
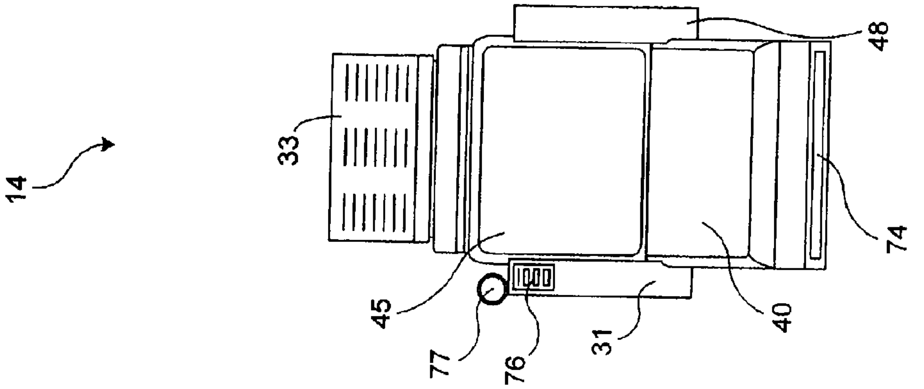
FIGS. 8*a* through 8*c* are side, rear, and top views of the gaming chair of FIG. 7.
Figure 8B:
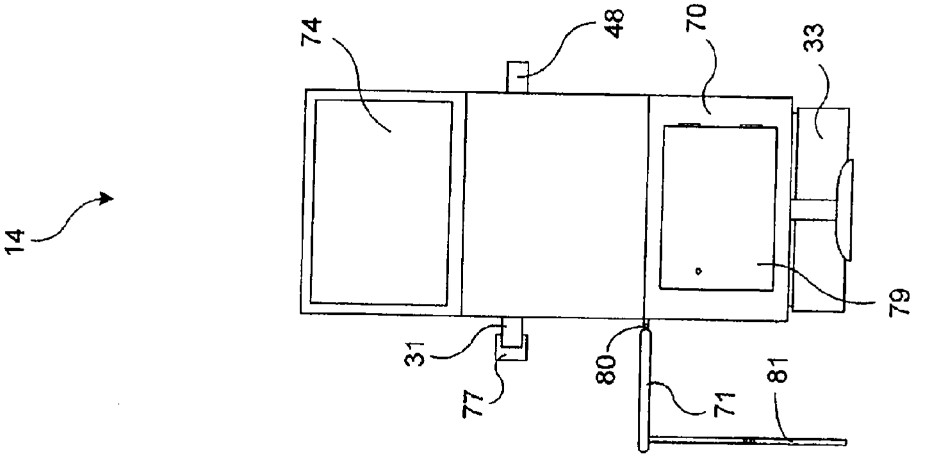
Figure 8A:
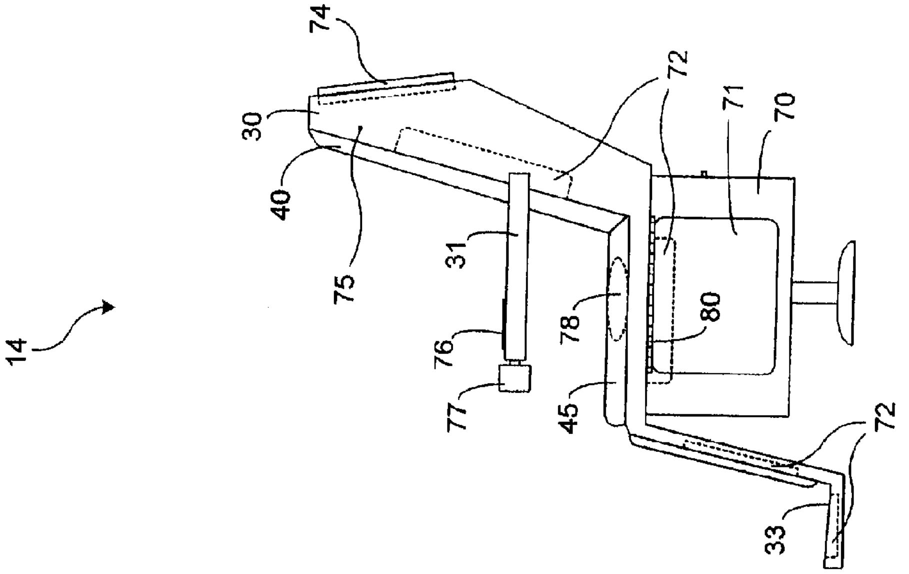

FIG. 8*a* is a side view of the gaming chair 14 introduced in FIG. 7. Storage area 70 comprises a large portion of the base of gaming chair 14. Storage area 70 can be accessed through a door 79 (see FIG. 8*b*) that can be locked. By locating the storage area 70 (typically found below most gaming machines) beneath the gaming chair 14, additional player comfort and ergonomics can be realized by opening additional foot and leg space beneath the gaming machine. A foldout companion seat 71 folds out to a secure position to provide additional seating for onlookers. In this embodiment, the companion seat 71 folds down via a hinge 80 to allow more access to the gaming chair 14 during transition periods between occupancy. When needed, companion seat 71 may be folded out to a horizontal position and at least one leg 81 (FIG. 8*b*) automatically positions itself to support the end opposite from the hinge 80.

Another aspect of gaming chair 14 shown in FIG. 8*a* is a set of individually controllable audio speaker devices 72 located behind seat back 40, under seat cushion 45, and within foot/leg rest 33. The gaming machine may control the speaker devices 72 during game play to deliver audio and tactile sensations related to the game. The speaker devices 72 may also be player controlled via the touch screen panel 76 located on left armrest 31. Each speaker device 72 can deliver various "massage" effects to a selected location, each location and effect individually controlled by the player. One method of delivering a tactile vibration effect to the gaming chair 14 is the use of woofer speaker devices deriving the effect from low-end audio frequencies. Acoustical energy of the speaker device 72, that is un-dampened or partially dampened, mounted within the gaming chair 14 can cause the tactile effect to the seated player. The tactile effect is a by-product of the acoustical energy transferring through the chair material.

Accordingly, in some embodiments a tactile response chair can be configured with a gaming device. This allows the player to be delivered a physical response to a gaming event. Adding a tactile experience to a gaming device increases the ability of a player to recognize game events if the casino is noisy or the player is hard-of-hearing or has vision problems.

One embodiment a tactile device, such as a speaker 72, for providing tactile sensations to the player via the seat according to at least one of events occurring in the wagering game, and player input through an input device. In other embodiments, the tactile device can include a motion device, such as discussed above (FIGS. 4*a*-4*c*). In other examples, the tactile device can deliver tactile sensations including one or more of vibration, massaging, temperature change (FIGS. 4*a*-4*c*), and/or pulsation.

Another audio feature, a headphone jack 75, is positioned in chair back 30 offering the player seated in the gaming chair 14 an alternative audio experience. While various connectors may be employed in this application, most offerings include a stereo mini-jack connector (3.5 mm) that is standard on most retail headphones sold today.

Continuing with FIG. 8*a*, a display unit 74, positioned in chair back 30, presents billboard information, product or service advertisements, player attraction material, pay tables (e.g., within a single game or for different games available via a multi-game machine), bonusing information, game help information, game play instructions, variable themes associated with a particular gaming venue or gaming machine, and combinations thereof. The display unit 74 may be implemented with a CRT, LCD, plasma, or other type of display known in the art. Interactive touch screen technology may also be available on the display unit 74. The gaming machine, a network controller, advertising servers, or a combination of each may be the source of the displayed information or of the signal prompting the display of the information. The signals providing the information may be dynamically or manually switched as generally disclosed in U.S. Pat. No. 6,089,975 to Dunn, et. al., issued Jul. 18, 2000 and entitled "Electronic Gaming Apparatus with Means for Displaying Interactive Advertising Programs," hereby incorporated in its entirety by reference. A touch screen panel 76 located on left armrest 31 provides a method of player input for a variety of chair and game features. Control of the vibration devices 72 can be realized through "massage" controls on the touch screen panel 76. Audio volume and other controls such a station tuning, bass/treble adjustments, balance, and track selection may also be offered. Additionally, a security mechanism such as finger biometrics can be included through the touch screen panel 76. Should the player not want the gaming machine to initiate the tactile sensations, a switch on the touch screen panel 76 can be used to prevent the game from triggering the vibration devices 72 or other such game-initiated events.

A convenience feature affixed to the end of left armrest 31 of gaming chair 14 is a drink holder 77. The drink holder 77 provides enough depth to maintain the position of the beverage container should it be jostled or the chair subjected to accidental force. While a fixed size drink holder 77 is depicted in FIG. 8*a*, a drink holder capable of adjusting, manually or automatically, to containers of varying sizes allows the gambling venue to offer beverages in various sized containers. Alternatively, drink holder 77 and storage area 70 can be incorporated into a side console providing the player with personal storage and additional convenience. The side console is similar to automobile side consoles that typically contain contained storage areas, trays for small items, and drink holders.

The padding material that comprises the seat cushion 45 and the seat back 40 is preferably memory foam. This visco-elastic material conforms to the body of the player sitting in the gaming chair 14. Originally developed for NASA, it reduces the pressure of gravity and has been used in the medical industry to prevent bedsores. It also becomes softer in warmer areas, where your body is making the most contact with the surface, and remains firmer in cooler areas, where less body contact is being made. Varying densities of the foam product offer different comfort levels at differing costs. For example, lower density memory foam at 4 lbs. per cubic foot is less expensive and offers less support than foam at 5.35 lbs. per cubic foot. This material is manufactured by a number of companies under different names. Viscolux® is manufactured by Carpenter Co., Richmond, Va. Tempur-Pedic® and TEMPUR® are manufactured by Tempur-Pedic International Inc., Lexington, Ky. The padding in seat cushion 45 may also be a combination of air and water filled compartments providing another visco-elastic surface for relieving pressure. Aqua-Aire Cushion LLC, SunCity, Ariz., manufactures this type of cushioning. Another air cushion design is one offered by The ROHO Group, Belleville, Ill., providing sealed or adjustable air cushions that can be incorporated into gaming chair 14. All heretofore mentioned padding materials or techniques may also be applied to both armrests on the gaming chair 14 and, referring to FIG. 5, the headrest 55.

Another comfort feature located in the seat cushion 45 is a seat pack 78. Seat pack 78 can be filled with a gel material to relieve pressure points. Seat pack 78 can also be an air chamber that can be inflated or deflated according to the player's wishes by using the touch screen panel 76. Seat cushion 45 may have a narrow void spanning from front to back, across the center of the seat and covered only by the outer cloth or other material comprising the seat surface. This void provides relief from pressure on the perineal artery that can result in numbness to the legs after prolonged periods of sitting.

FIG. 8*b* is a rear view of gaming chair 14 showing the back of left armrest 31, footrest 33, right armrest 48, and cup holder 77. Door 79 provides access to the storage area 70 and can be configured with a locking mechanism. Display 74 is positioned across the top back portion of the gaming chair 14 and is shown covering a large portion of the back of the gaming chair 14. However, it should be appreciated that the display 74 can be any size and positioned according to design requirements and other considerations. In FIG. 8*a*, companion seat 71 is shown in FIG. 8*b* in its extended or used position. Hinged seat leg 81 is extended to the floor and creates a 90-degree angle with companion seat 71. Companion seat 71 is connected to the gaming chair 14 by hinge 80 allowing a user to lift the seat up for use or drop the seat back into its stowed position (see FIG. 8*a*). The combination of hinge 80 and hinged seat leg 81 provide the bracing necessary to support the weight of a user. The number of hinged seat legs 81 may be two and have a connecting rod between them for additional support and easier deployment and retraction. Hinge 80 and hinged seat leg 81 may also be spring-loaded to assist in the stowing of the companion seat 71. While this embodiment shows the companion seat 71 with a folding mechanism, a spring-loaded recess that can automatically stow the seat in a slot under the seat cushion 45 can be used.

FIG. 8*c* is a top view of gaming chair 14 showing the positions of left armrest 31, footrest 33, seat back 40, seat cushion 45, right armrest 48, display 74, touch screen panel 76, and cup holder 77.

While the embodiment shown in FIG. 8*a* through 8*c* presents the features in certain positions, it will be appreciated by those with ordinary skill in the art that the location of any feature is dependent on such factors as the requirements of the feature, the design of the gaming chair, ergonomics, player convenience, and the economy of the design.

According to some embodiments, button or touch screen panels, located on the armrests of gaming chair 14, control a number of gaming machine and gaming chair features. These features include, but are not limited to, audio settings such as volume, speaker preferences, system sounds, and field sound effects as described in U.S. patent application Ser. No. 10/342,809 to Pryzby, et. al., filed Jan. 16, 2003 and entitled "Selectable Audio Preferences for a Gaming Machine," hereby incorporated in its entirety by reference. Additional settings such as game selection, control and play can also be initiated from the button or touch screen panels.

While embodiments of the present invention have been described with reference to one or more particular embodiments, those skilled in the art will recognize that many changes may be made thereto without departing from the spirit and scope of the present invention.

Figure 9:
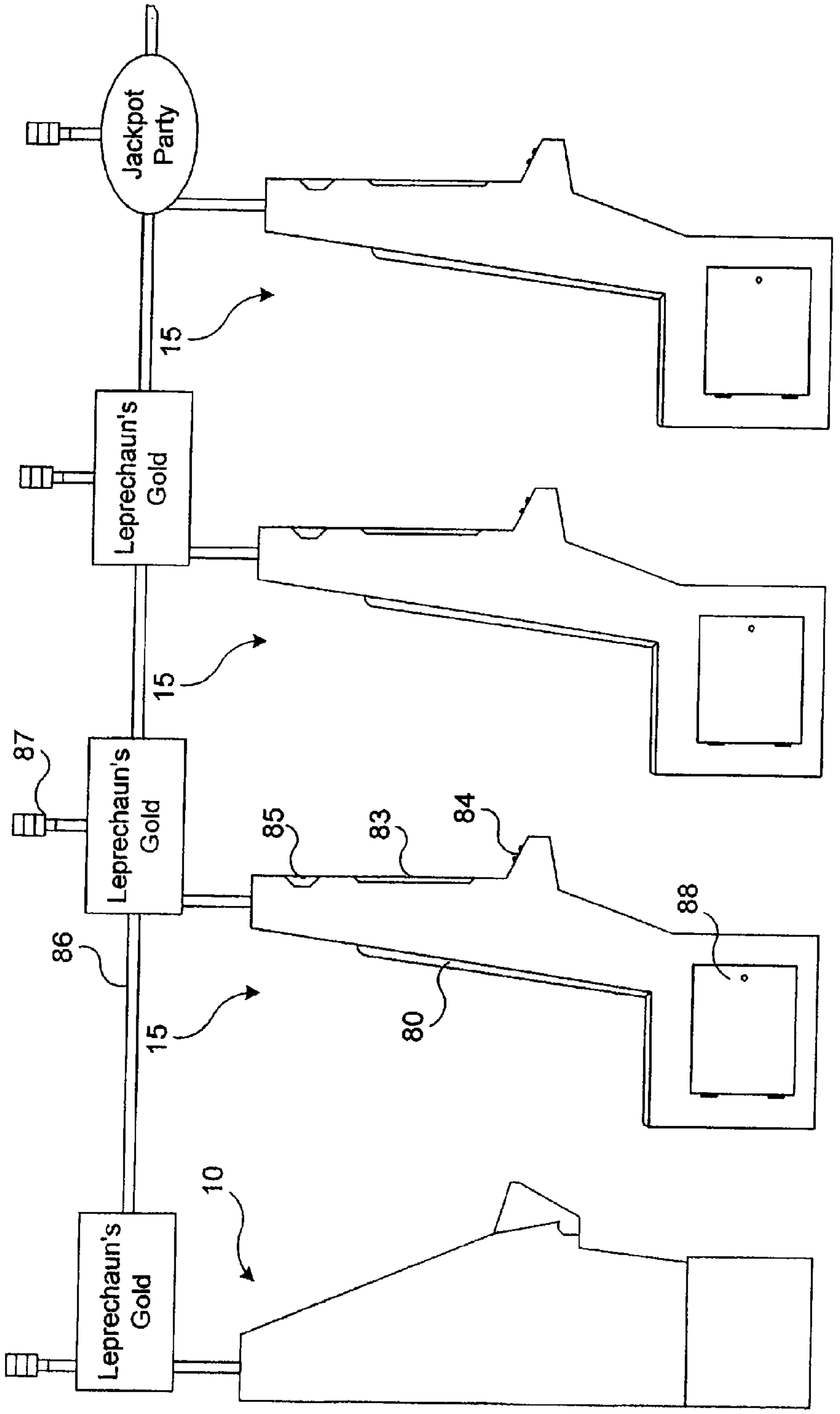
FIG. 9 is an alternative embodiment showing a side view of a series of gaming machines positioned in the backs of gaming chairs.

For example, a gaming booth system shown in FIG. 9 uses the display feature presented in previous embodiments as the actual game display for the gaming chair behind it. Gaming booth 15 is positioned adjacent to gaming machine 10. Gaming booth 15 incorporates the gaming machine for the player behind it into the chair's back, behind seat back 80. A display 83 for displaying game content is positioned at a seated player's eye level. Button panel 84 is ergonomically positioned for optimal player accessibility and comfort. Audio speakers 85 are also positioned above the display 83 providing game sound effects and other audio offerings. The gaming booths 15 are interconnected to each other and the gaming local area network by a piping system 86. A tower light 87 for each gaming booth 15 is connected to the piping system so as to be positioned over the player seated at the gaming booth 15. The gaming booth 15 at the end of the row can have a standard gaming chair associated with it. Each gaming booth 15 can also be equipped with retracting armrests according to some embodiments. This alternative booth system provides space savings to gambling venues with limited floor area such as riverboats, cruise ships, and smaller casinos. Game offerings with themes such as airplanes, trains, and buses could also benefit from a booth system because of the similar seating nature used in those vehicles. Other wagering games such as keno and sports wagering could benefit from a booth system.

Figure 10C:
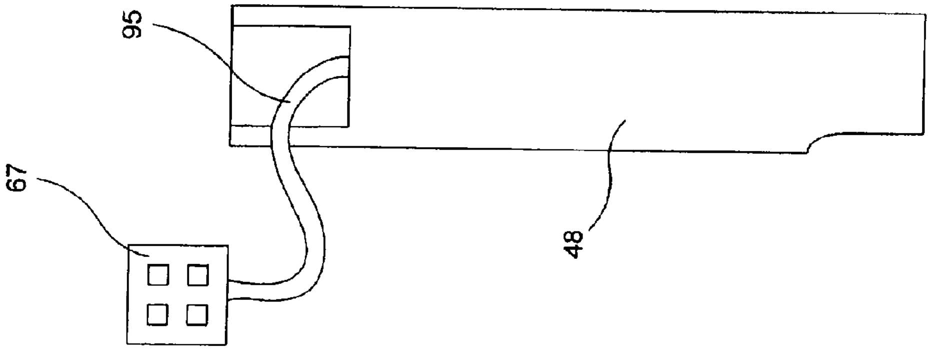
FIGS. 10*a* through 10*c* are a series of views of a gaming chair armrest with a removable remote button panel, shown in various stages of removal.
Figure 10B:
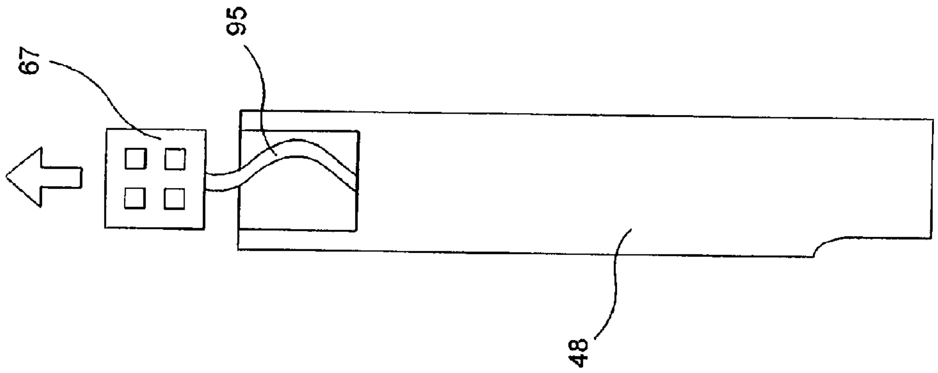
Figure 10A:
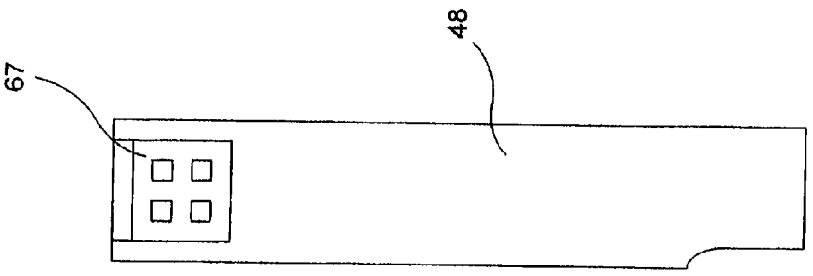

An alternative to fixed button and touch screen panels described in the previous embodiments is a removable button panel. FIG. 10*a* through 10*c* are sequence drawings showing a removable button panel 67. FIG. 10*a* shows a detailed view of the armrest 48 originally depicted in FIG. 6*c*. Button panel 67 is shown connected with the armrest 48. As shown in FIG. 10*b*, the button panel 67 can be slid forward and out of a slot or cradle in the front portion of the armrest 48. A retractable cord or tether 95 serves to connect the button panel 67 to the armrest 48. The retractable cord 95 prevents disconnection of the button panel 67 from the armrest. The button panel 67 can either communicate with the chair controller or gaming machine through wiring with the retracting cable 95 or via infrared, wireless, or other remote communication technologies. FIG. 10*c* shows the capability of the button panel 67 to be positioned where the player is most comfortable. The length of retractable cord 95 allows the button panel 67 to be moved so as to allow the player to use the device in the opposite (left) hand. While the retractable cord 95 should be kept to a reasonable length, it could be long enough to allow the player to stand on the opposite side of the gaming chair from the armrest containing the removable button panel 67. The button panel 67 is comprised of, but not limited to, any of the following types of buttons including capacitive, resistive, and acoustic touch screen, magnetic switch, electromechanical switch, membrane switch, and elastomeric, a technology used on such devices as television remote controls. The buttons have locator bumps or raised surface areas on them for easy touch recognition that is especially useful in allowing the player to continually view the gaming machine display without the need to look down at the button panel 67. The buttons can be lit from an internal source such as a light emitting diode (LED). Configurable buttons can also be used such as those whose function is identified by an LCD screen in direct proximity to the button. In offerings such as multi-game machines, this feature is configured when the new game is chosen. The button name and function changes when the game changes on the gaming machine. A variation of this example is the LCD button. A backlit LCD screen is incorporated into the button itself allowing the name and color of the button to change between selected games. In a different user control variation, a short-throw slot handle on the button panel mimicking the motion of a standard slot machine pull handle can be offered. This feature could also be deployed as a full sized handle located on the side of the gaming chair.

While the embodiment shown in FIG. 10*a* through 10*c* presents the button panel 67 in certain positions, it will be appreciated by those with ordinary skill in the art that the location of this feature is dependent on such factors as the requirements of the feature, the design of the gaming chair, ergonomics, player convenience, and the economy of the design.

Figure 11:
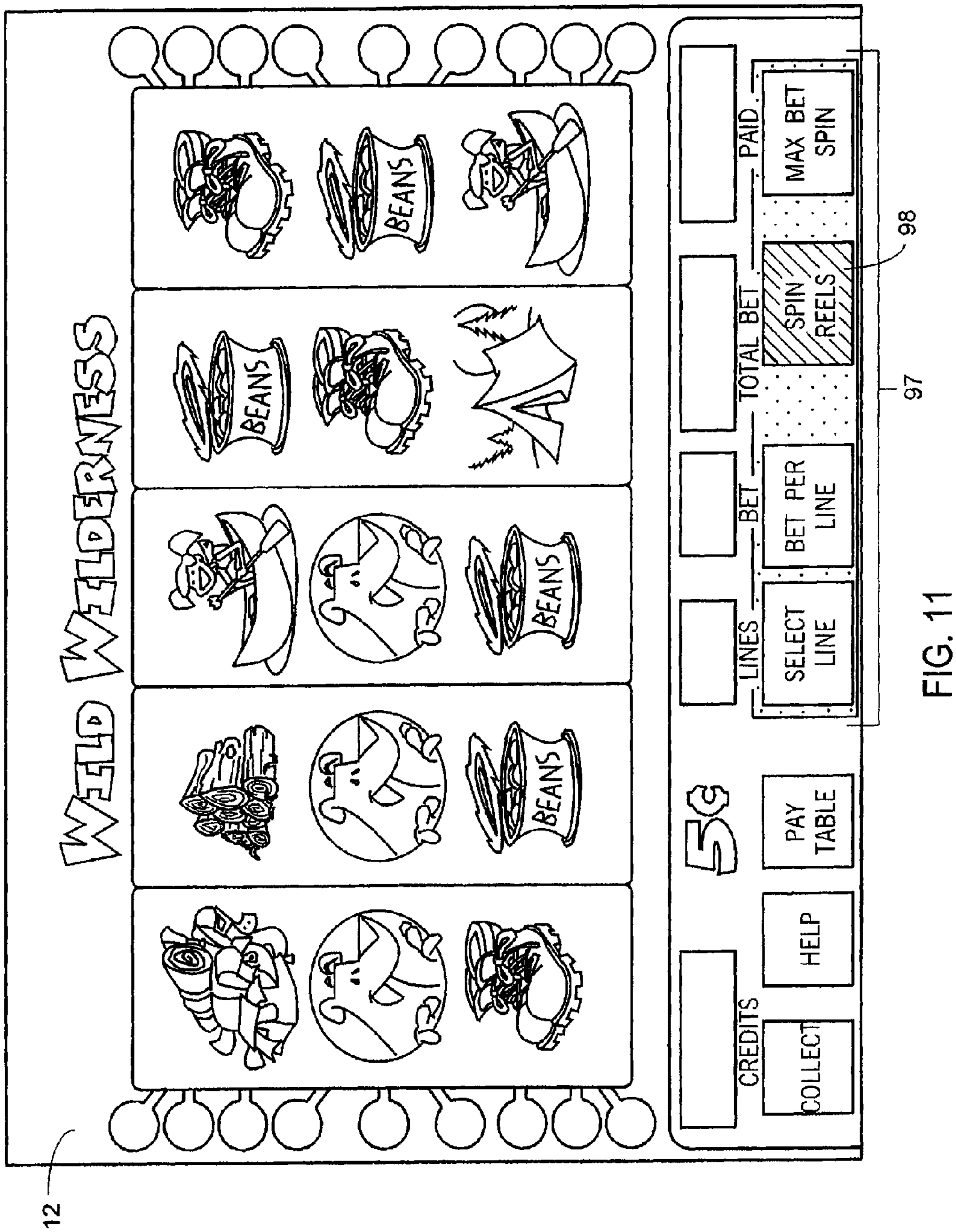
FIG. 11 is a display image of a slot game showing highlighted touch screen buttons for player recognition during game play.

As an addition or variation of the button panel locator bumps recognition feature, a graphic image of the button panel is presented in a portion of the gaming machine's display allowing the user to quickly view the position of the buttons on the armrest button panel without the need to look away from the display. FIG. 11 shows an example of a screen display 12 with a group of button images 97 highlighted. The button images 92 represent the same buttons located on the gaming chair's armrest. As the player presses a button on the armrest button panel, the respective button on the screen display 12 can be highlighted to confirm to the player the button they pressed. In this example, the player pressed a "Spin Reels" button on the armrest button panel. The corresponding SPIN REELS button image 98 on the screen display 12 is highlighted or altered to represent the action performed by the player. The group of button images on the screen display can be touch screen buttons or a simple graphic image. Since repetitive game play is likely to ingrain the buttons and their functions in the players mind, the graphic display feature on the gaming machine's display can be switched off if so desired by the player.

Figure 12A:
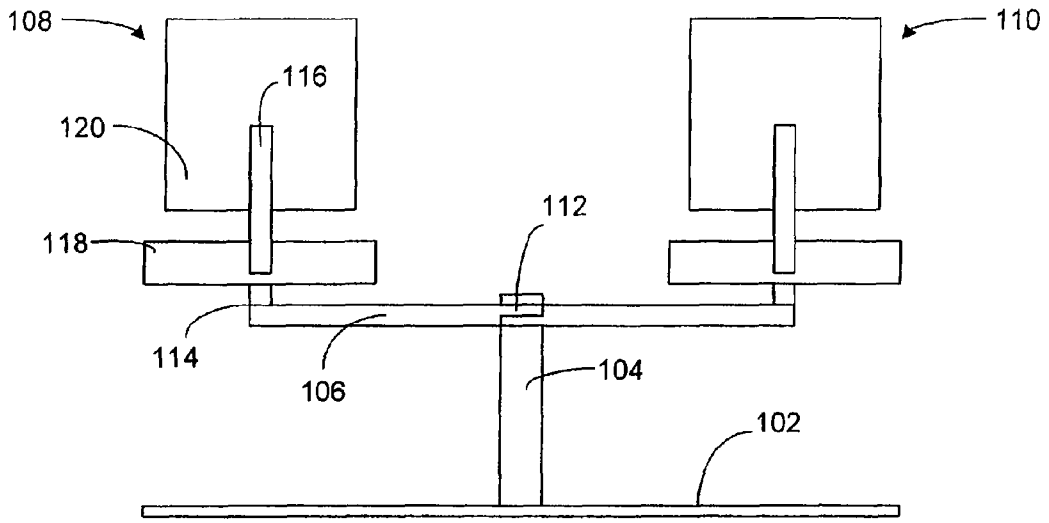
FIGS. 12*a* through 12*c* are rear and top views of a plurality of gaming chairs with additional positioning capabilities.
Figure 12B:
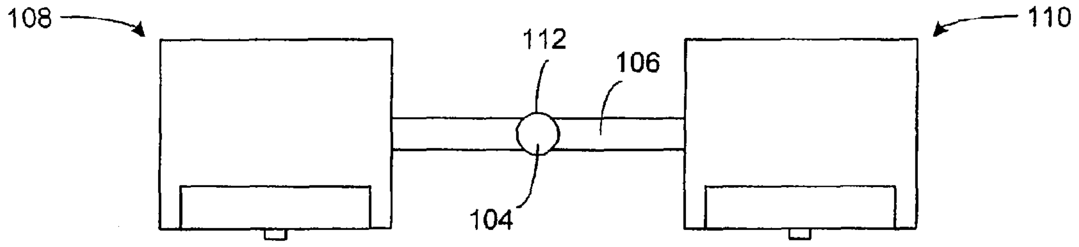
Figure 12C:
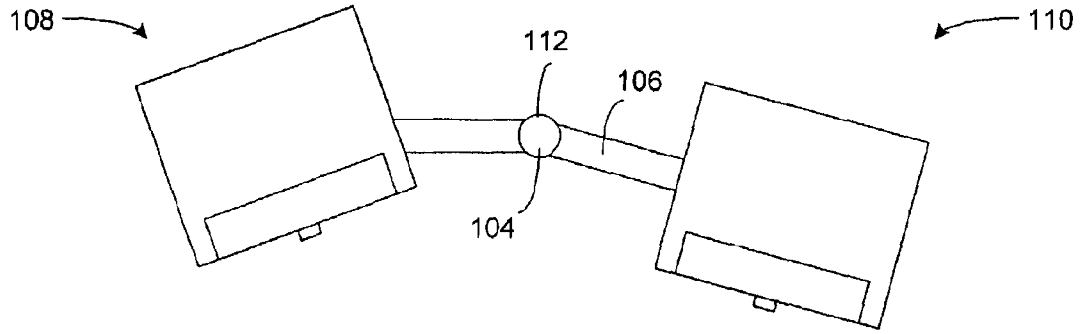

Another alternative embodiment of a gaming machine chair is shown in FIGS. 12*a* though 12*c*. FIG. 12*a* is a back view of a gaming chair combination, comprised of chair 108 and chair 110. Chair 108 and chair 110 are connected to support post 104 via horizontal beam 106. Support post 104 is connected to a moveable floor plate or "sled" 102. Sled 102 allows the chairs to be moved during repositioning of the gaming floor, cleaning, or maintenance activities. A connection point 112 that secures the horizontal beam 106 to the support post 104 also serves as a pivot mechanism allowing the beam to move 45 degrees forward and 45 degrees back along a horizontal plane. Another connection point 114, connecting the chair 108 to horizontal beam 106, also serves as a pivot mechanism allowing the chairs to pivot. Chair 108 and chair 110 are comprised of a seat 118, a seatback support 116 and a seat back 120. FIG. 12*b* is a top view of the gaming chair combination. This view clearly shows the support post 104 and the connection point 112 that allows the horizontal beams 106 to rotate around the support post 104. In another top view, FIG. 12*c* shows an example of how the rotation of the horizontal beams 106 around the support post 104, and the chairs 108, 110 around connection point 114 (see FIG. 12*a*) can be limited. In this example, the chairs 108, 110 can rotate 45 degrees towards each other and 90 degrees away. The horizontal beams 106 can rotate 45 degrees forward or back around support post 104. These ranges of motion provide the player the ability to adjust the chair during game play to create the most comfortable position. It also allows the player the ability to move the chair into a position that makes access to and from the chair easier and more convenient. The pivot points of this chair combination are spring loaded causing the chair to return to a predetermined position that maintain the aesthetics of the gambling venue.

Each of these embodiments and obvious variations thereof is contemplated as falling within the spirit and scope of the claimed invention, which is set forth in the following claims.

What is claimed is:

1. A gaming system, comprising:

a gaming chair including an armrest and a user interface coupled to the armrest, the user interface including a plurality of buttons; and a gaming machine for conducting a wagering game, the gaming machine including a display panel displaying a graphic image of the user interface, the graphic image including a plurality of button images arranged to represent the physical layout of the buttons on the user interface, thereby enabling a user to determine the relative positions of the buttons by viewing the display panel;

wherein user actuation of a selected one of the buttons results in a display indication being presented on a corresponding button image in the graphic image.

2. The gaming system of claim 1, wherein the display indication comprises highlighting of the button image.

3. The gaming system of claim 1, wherein the display indication comprises altering a visual appearance of the button image.

4. The gaming system of claim 1, wherein the user interface is detachable from the armrest.

5. The gaming system of claim 4, wherein the user interface is connected to the gaming chair with a tether.

6. The gaming system of claim 5, wherein the tether is retractable.

7. The gaming system of claim 4, wherein the user interface is wirelessly connected to the gaming chair or the gaming machine.

8. The gaming system of claim 4, wherein the user interface is structured to be received in a cradle on the armrest.

9. The gaming system of claim 1, wherein each of the buttons on the user interface includes a locator bump configured to provide a user with touch recognition of the buttons.

10. The gaming system of claim 1, wherein the user interface comprises a touch screen display.

11. The gaming system of claim 1, wherein the buttons on the user interface are backlit.

12. A gaming system, comprising:

a gaming machine for conducting a wagering game, the gaming machine including a display panel; and a gaming chair including a user interface having a plurality of buttons, the user interface being detachably coupled to the gaming chair such that the user interface may be operated at a user-selected position;

wherein the gaming machine is configured to display a graphic image of the user interface on the display panel, the graphic image including a plurality of button images that match the relative positions of the buttons on the user interface; and wherein selections made using the buttons on the user interface are verified by visually altering the corresponding button image on the display panel.

13. The gaming system of claim 12, wherein the user interface is detachably coupled to the gaining chair with a retractable tether.

14. The gaming system of claim 12, wherein the button images displayed on the display panel are touch screen buttons.

15. The gaming system of claim 12, wherein the buttons on the user interface are configurable such that the function of the buttons may be altered to correspond with different wagering games.

16. A method of operating a gaming machine, comprising:

displaying a graphic image of a user interface, which is coupled to a gaming chair, on a display panel of the gaming machine, the graphic image including a plurality of button images indicating the relative positions of a corresponding plurality of buttons on the user interface;

receiving actuation of one of the buttons on the user interface at a location spaced from the gaming machine, the actuation indicative of a desired user selection; and visually altering the button image corresponding to the actuated button, on the display panel, to depict the user selection.

17. The method of claim 16, wherein actuating one of the buttons on the user interface is made while viewing the graphic image on the display panel.

18. The method of claim 16, further comprising detaching the user interface from the gaming chair.

19. The method of claim 18, wherein detaching the user interface from the gaming chair includes advancing a tether from a position within the gaming chair.

* * * * *

UNITED STATES PATENT AND TRADEMARK OFFICE

CERTIFICATE OF CORRECTION

PATENT NO. : 8,747,225 B2
APPLICATION NO. : 13/348411
DATED : June 10, 2014
INVENTOR(S) : Stephen A. Canterbury et al.

It is certified that error appears in the above-identified patent and that said Letters Patent is hereby corrected as shown below:

In the Claims:

On Column 16, Line 14 (Claim 13, Line 2), please delete “gaining” and insert -- gaming --, therefor.

Signed and Sealed this
Thirtieth Day of September, 2014

Michelle K. Lee
*Deputy Director of the United States Patent and Trademark Office*